(12) United States Patent
Huang et al.

(10) Patent No.: US 12,540,460 B2
(45) Date of Patent: Feb. 3, 2026

(54) FAUCET AND PIPELINE STRUCTURE THEREOF

(71) Applicant: Xiamen Lota International Co., Ltd., Fujian (CN)

(72) Inventors: Qiang Huang, Fujian (CN); Yanyan Wang, Fujian (CN); Chenglong Lin, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 111 days.

(21) Appl. No.: 18/393,874

(22) Filed: Dec. 22, 2023

(65) Prior Publication Data

US 2025/0059738 A1    Feb. 20, 2025

(30) Foreign Application Priority Data

Aug. 16, 2023   (CN) .......................... 202311028865.4
Nov. 13, 2023   (CN) .......................... 202323059228.1

(51) Int. Cl.
*E03C 1/04*     (2006.01)
*F16K 11/00*    (2006.01)

(52) U.S. Cl.
CPC .......... *E03C 1/0403* (2013.01); *F16K 19/006* (2013.01)

(58) Field of Classification Search
CPC ..... E03C 4/0403; E03C 1/0404; E03C 1/0403
USPC .................................................... 4/677
See application file for complete search history.

(56) References Cited

U.S. PATENT DOCUMENTS

| 8,468,620 | B2 * | 6/2013 | Tarng ................ E03C 1/0403 |
| | | | 4/677 |
| 9,611,945 | B2 * | 4/2017 | Kemp ................. F16K 19/006 |
| 10,006,190 | B1 * | 6/2018 | Johnson .................. E03C 1/04 |
| 10,233,617 | B1 * | 3/2019 | He .................... E03C 1/0404 |
| 2023/0279648 | A1 * | 9/2023 | Kury .................... F16L 33/28 |
| | | | 137/801 |
| 2023/0383507 | A1 * | 11/2023 | Kury .................. E03C 1/0403 |

* cited by examiner

*Primary Examiner* — Huyen D Le
(74) *Attorney, Agent, or Firm* — Cooper Legal Group, LLC (57) ABSTRACT

A pipeline structure of the faucet comprises a pipeline assembly and a valve seat. The pipeline assembly comprises a connecting seat, at least one water inlet pipe, and at least one water outlet pipe. The connecting seat is detachably connected to the valve seat, and a first end of the at least one water inlet pipe and a first end of the at least one water outlet pipe are integrally connected to the connecting seat. The at least one water inlet pipe comprises a first water inlet seat, and the at least one water outlet pipe comprises a first water outlet seat. The first water inlet seat of the at least one water inlet pipe and the first water outlet seat of the at least one water outlet pipe are respectively fluidly connected to the valve seat, and a valve is configured to be connected to the valve seat.

13 Claims, 9 Drawing Sheets

FAUCET AND PIPELINE STRUCTURE THEREOF

RELATED APPLICATIONS

This application claims priority to Chinese patent application number 202311028865.4, filed on Aug. 3, 2023 and Chinese patent application number 202323059228.1, filed on Nov. 13, 2023. Chinese patent application number 202311028865.4 and Chinese patent application number 202323059228.1 are incorporated herein by reference.

FIELD OF THE DISCLOSURE

The present disclosure relates to the field of sanitary ware, and in particular to a faucet and a pipeline structure of the faucet.

BACKGROUND OF THE DISCLOSURE

Faucet housings of conventional faucets, such as single-handle faucets, are usually made by casting. The faucet housings are usually made of copper alloy. For faucets made of copper, a water outlet tube body is usually directly formed on the faucet housing. A pipeline structure of this type of faucet comprises a valve seat on which the valve is installed and multiple pipes connected to the valve seat. Ends of the multiple pipes are connected to the valve seat through threads. During installation, the valve seat needs to be installed on the faucet housing first, and then the ends of multiple pipes are extended into the faucet housing from a lower end of the faucet housing. There are many installation steps, and the installation is troublesome. In addition, this type of faucet also comprises a water outlet pipe extending inside the faucet housing. This water outlet pipe generally connects a water outlet to a side of the valve seat where the valve is installed. This requires a large assembly space, making it difficult to achieve waterway connection in a small space inside the faucet housing.

BRIEF SUMMARY OF THE DISCLOSURE

The present disclosure provides a pipeline structure of a faucet to solve the deficiencies in the background. The pipeline structure of the faucet comprises a pipeline assembly and a valve seat. The pipeline assembly comprises a connecting seat, at least one water inlet pipe, and at least one water outlet pipe. The connecting seat is detachably connected to the valve seat, and a first end of the at least one water inlet pipe and a first end of the at least one water outlet pipe are integrally connected to the connecting seat. The at least one water inlet pipe comprises a first water inlet seat formed on the connecting seat, and the at least one water outlet pipe comprises a first water outlet seat formed on the connecting seat. The first water inlet seat of the at least one water inlet pipe and the first water outlet seat of the at least one water outlet pipe are respectively fluidly connected to the valve seat, and a valve is configured to be connected to the valve seat.

In a preferred embodiment, the connecting seat comprises a first end surface and a second end surface, and the valve seat is detachably connected to the first end surface. The first water inlet seat of the at least one water inlet pipe and the first water outlet seat of the at least one water outlet pipe are respectively formed on the first end surface. The first end of the at least one water inlet pipe and the first end of the at least one water outlet pipe are integrally connected to the second end surface of the connecting seat.

In a preferred embodiment, the first water inlet seat of the at least one water inlet pipe and the first water outlet seat of the at least one water outlet pipe respectively protrude from the first end surface. The valve seat comprises a plurality of connection ports, and the plurality of connection ports are respectively matched with and connected to the first water inlet seat of the at least one water inlet pipe and the first water outlet seat of the at least one water outlet pipe in an inserted manner.

In a preferred embodiment, each of the first water inlet seat of the at least one water inlet pipe and the first water outlet seat of the at least one water outlet pipe is hermetically connected to a corresponding one of the plurality of connection ports through a sealing ring.

In a preferred embodiment, a positioning connection structure is disposed between the first end surface and the valve seat.

In a preferred embodiment, the pipeline structure comprises a plurality of the valve seats of different sizes, and the plurality of the valve seats of different sizes are replaceably connected to the connecting seat.

In a preferred embodiment, the pipeline assembly is made of plastic, rubber, or elastomeric polymer.

A faucet comprises the pipeline structure.

In a preferred embodiment, the faucet comprises a faucet housing, a connecting joint, a water outlet connecting pipe. The faucet housing comprises a body and a faucet outlet which are integrally connected together, and the faucet outlet is connected to an upper side of the body. The connecting seat is disposed in the installation chamber, and the at least one water inlet pipe and the at least one water outlet pipe are at least partially disposed in the body. A second end of the at least one water inlet pipe and a second end of the at least one water outlet pipe are located outside a lower end of the body. The connecting joint is detachably connected to the second end of the at least one water outlet pipe and the water outlet connecting pipe, and the water outlet connecting pipe at least extends through the body and faucet outlet to be connected to a distal end of faucet outlet.

In a preferred embodiment, a connecting conjunction between the faucet outlet and the body comprises a passage opening through which the water outlet connecting pipe passes.

In a preferred embodiment, the connecting seat is disposed at a bottom of the installation chamber, and the bottom of the installation chamber comprises an installation opening through which the at least one water inlet pipe and the at least one water outlet pipe passes.

In a preferred embodiment, the faucet comprises the valve and a pressing lid. The connecting seat, the valve seat, and the valve are disposed in the installation chamber from bottom to top, and the pressing lid is connected to the installation chamber to fixedly press the valve.

In a preferred embodiment, the connecting joint comprises a connecting body and a connecting buckle, and the connecting body comprises a connection opening. An upper part of the connection opening forms a connection space, and a lower part of the connection opening forms an internal flow channel. Two inlets of the internal flow channel are respectively connected to the connection space, and a buckle hole is formed in a wall of the connection space. The second end of the at least one water outlet pipe comprises a first annular groove, and a first end of the water outlet connecting pipe comprises a second annular groove. The connecting buckle comprises a buckle ring and an elastic buckle block formed on the buckle ring. The buckle ring is configured to be sleeved on and surrounds the first annular groove of the at least one water outlet pipe and the second annular groove of the water outlet connecting pipe. The buckle ring, the second end of the at least one water outlet pipe, and the first end of the water outlet connecting pipe are configured to form a connection head. The connection head is configured to be mounted from the connection opening so that the elastic buckle block is correspondingly connected to the buckle hole and the second end of the at least one water outlet pipe and the first end of the water outlet connecting pipe are respectively connected to the two inlets of the internal flow channel.

In a preferred embodiment, the connecting joint comprises a connecting body and two elastic buckles, and the connecting body comprises an internal flow channel. Two inlets of the internal flow channel respectively face different directions, and a hole is formed on an inside of each of the two inlets. An operation button corresponding to the hole is disposed on an outside of each of the two inlets, and the second end of the at least one water outlet pipe forms a first annular groove. A first end of the water outlet connecting pipe forms a second annular groove, and each of the two elastic buckles comprises a buckle ring portion and an elastic buckle block formed on the buckle ring portion. The buckle ring portion is rotatably sleeved on the first annular groove or the second annular groove, and an inner wall of each of the two inlets comprises a guiding groove. A circumferential width of the guiding groove gradually increases in a direction toward an entrance of a corresponding one of the two inlets, and each of the two elastic buckles comprises a guiding block configured to extend into the guiding groove. The guiding block is configured to be guided and slide in the guiding groove to deflect a corresponding one of the two elastic buckles to rotate until the corresponding one of the two elastic buckle blocks corresponds to the hole. The operation button is configured to be pressed to correspond to the corresponding one of the two elastic buckle blocks so that the corresponding one of the two elastic buckle blocks is configured to release a connection with the hole.

In a preferred embodiment, the guiding block comprises two guiding inclined surfaces, and axial front ends of the two guiding inclined surfaces intersect. A distance between axial rear ends of the two guiding inclined surfaces gradually increases, and the guiding block is formed on an axial front end of each of the two elastic buckle blocks. An axial rear end of each of the two elastic buckle blocks is configured to be snap-connected with the hole.

Compared with the existing techniques, the technical solution has the following advantages.

1. The pipeline structure of the faucet comprises the pipeline assembly and the valve seat. The pipeline assembly comprises the connecting seat, the at least one water inlet pipe, and the at least one water outlet pipe. The connecting seat is detachably connected to the valve seat. The first end of the at least one water inlet pipe and the first end of the at least one water outlet pipe are integrally connected to the connecting seat, and the at least one water inlet pipe comprises the first water inlet seat formed on the connecting seat. The at least one water outlet pipe comprises the second water outlet seat formed on the connecting seat. The first water inlet seat of the at least one water inlet pipe and the second water outlet seat of the at least one water outlet pipe are respectively fluidly connected to the valve seat, and the valve is configured to be connected to the valve seat. The at least one water inlet pipe, the at least one water outlet pipe, and the connecting seat are integrally connected together to be detachably connected to the valve seat through the connecting seat, so that the at least one water inlet pipe and the at least one water outlet pipe do not need to be respectively connected to the valve seat, which is easy to assemble and has a low cost. Furthermore, the pipeline structure can be used in a faucet housing of a small size.

2. The detachable connection between the valve seat and the connecting seat can be matched with different valve seats and is suitable for the installation of different valves.

3. The connecting seat comprises the first end surface and the second end surface, and the valve seat is detachably connected to the first end surface. The first water inlet seat of the at least one water inlet pipe and the second water outlet seat of the at least one water outlet pipe are respectively formed on the first end surface, and the first end of the at least one water inlet pipe and the first end of the at least one water outlet pipe are integrally connected to the second end surface of the connecting seat. In this configuration, a radial size of the pipeline structure is smaller, and is suitable for a body of a faucet housing of a small size.

4. Each of the first water inlet seat of the at least one water inlet pipe and the second water outlet seat of the at least one water outlet pipe is hermetically connected to a corresponding one of the plurality of connection ports through the sealing ring. The sealing ring enables the at least one water inlet pipe, the at least one water outlet pipe, and the valve seat to define a radial sealing connection, and compared with an axial sealing connection in the prior art, the sealing effect is better.

5. The faucet comprises the faucet housing. The faucet housing comprises the body and the faucet outlet which are integrally connected together, and the faucet outlet is connected to an upper side of the body. The connecting seat is disposed in the installation chamber, and the at least one water inlet pipe and the at least one water outlet pipe are at least partially disposed in the body. The second end of the at least one water inlet pipe and the second end of the at least one water outlet pipe are located outside the lower end of the body. The faucet comprises the connecting joint and the water outlet connecting pipe, and the connecting joint is detachably connected to the second end of the at least one water outlet pipe and the water outlet connecting pipe. The water outlet connecting pipe at least extends through the body and faucet outlet to be connected to a distal end of faucet outlet. The connecting joint is located outside of the body, and the body has a smaller radial size. The at least one water inlet pipe, the at least one water outlet pipe, and the water outlet connecting pipe are located within an axial projection of the connecting seat, and a radial size of the body can be smaller, which is easy to assemble, and there is no need to align the pipelines from the lower end of the body.

DETAILED DESCRIPTION OF THE EMBODIMENTS

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms "upper", "lower", "inner", "outer", "top/bottom", etc. indicate the orientation or positional relationship based on the orientation shown in the drawings. The positional relationship is only for the convenience of describing the present disclosure and simplifying the description, rather than indicating or implying that the pointed device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a fixed connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Referring to FIGS. 1 to 7, a faucet in a first embodiment is provided, and the faucet comprises a faucet housing 1, a pipeline structure, a valve 3, a pressing lid 4, and a handle assembly 5.

Figure 1:
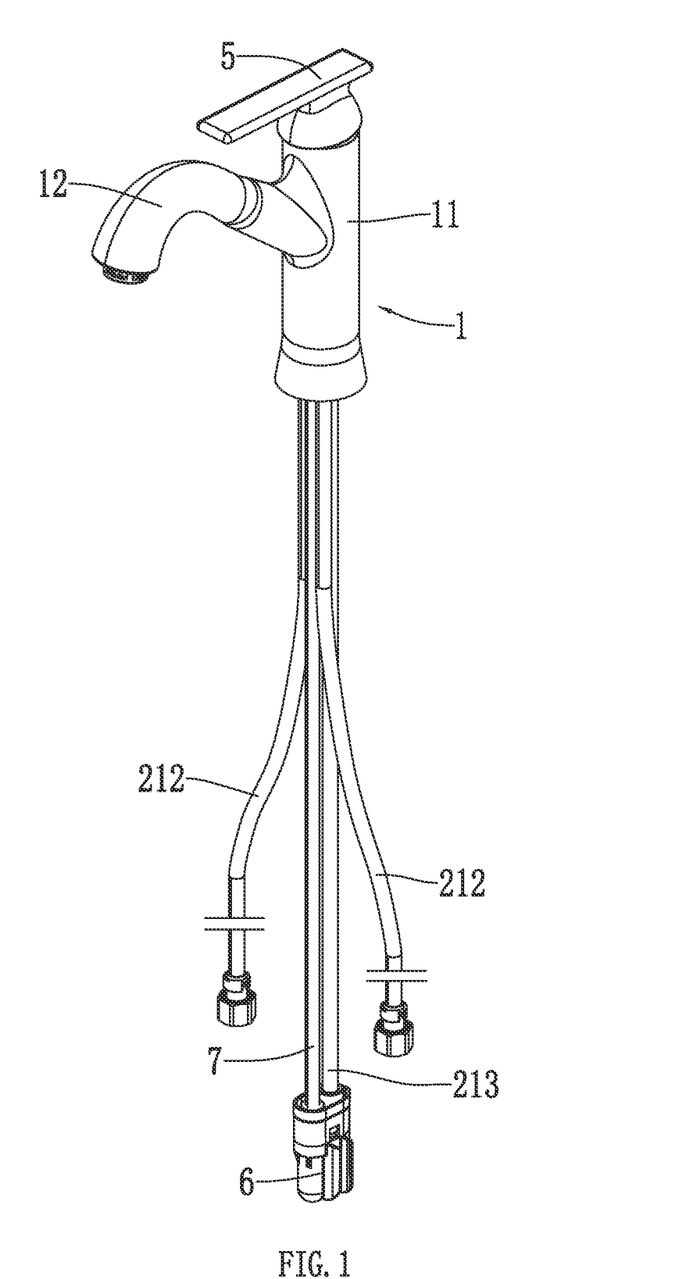
FIG. 1 illustrates a perspective view of a faucet in a first embodiment of the present disclosure.
Figure 2:
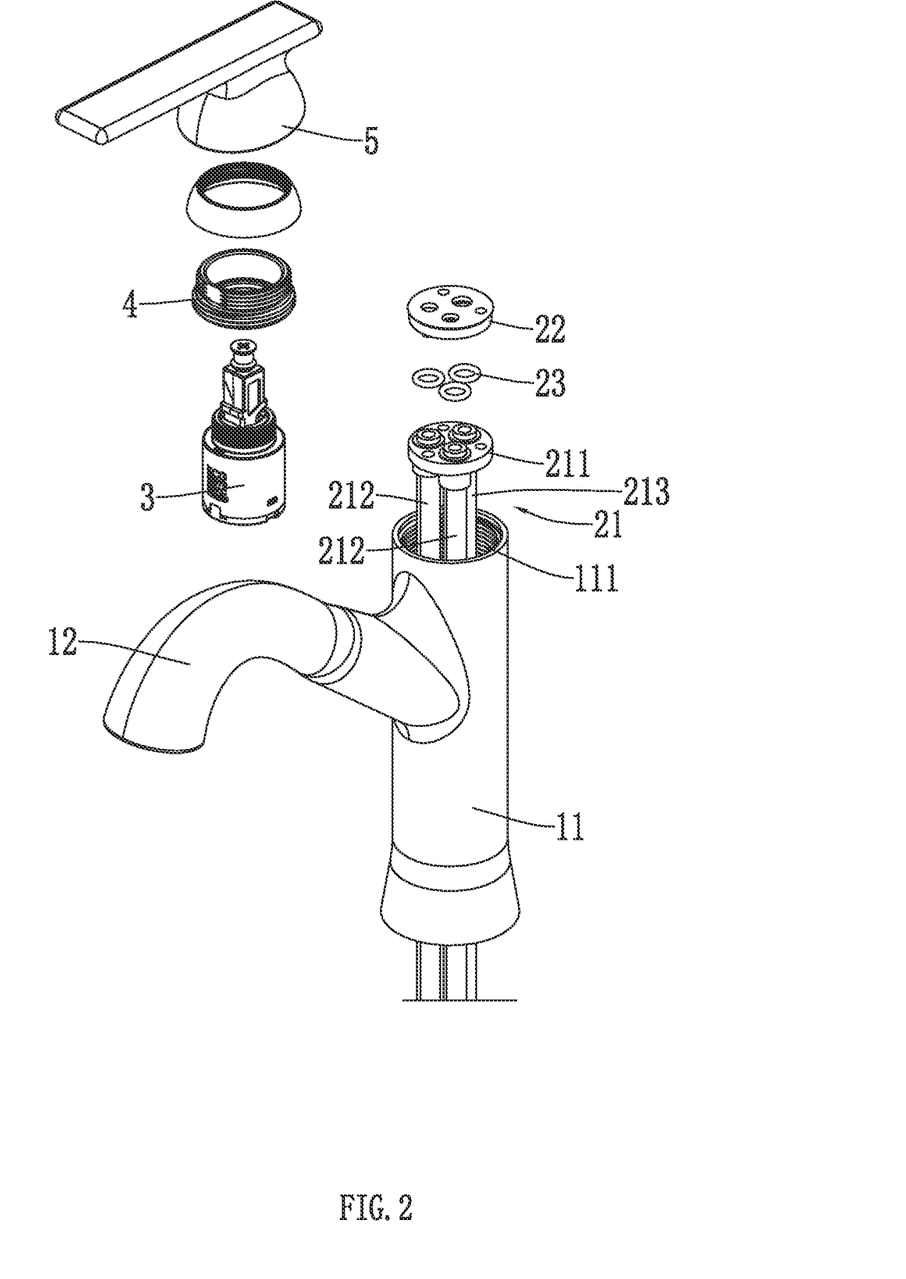
FIG. 2 illustrates a perspective exploded view of the faucet in the first embodiment of the present disclosure.
Figure 4:
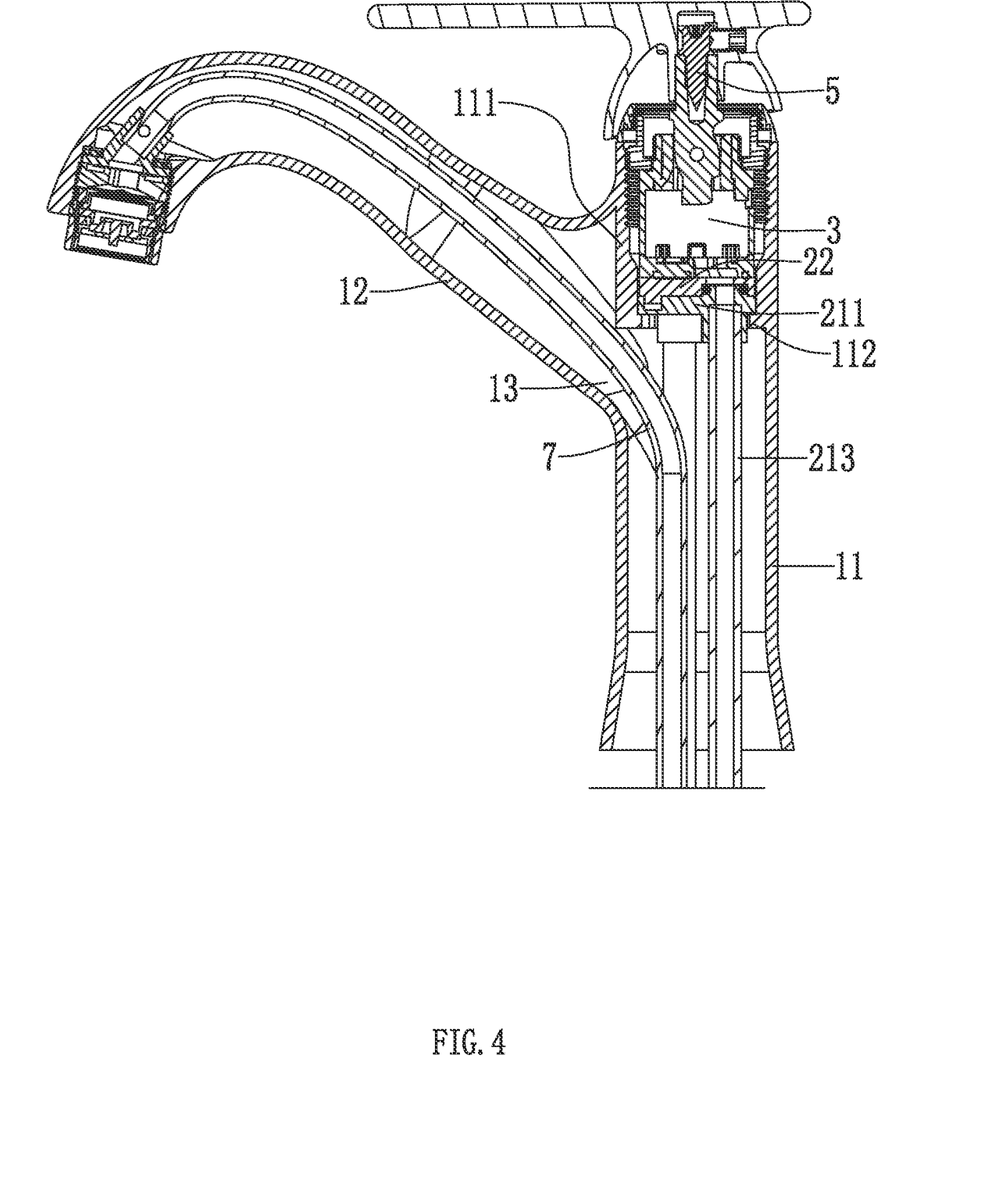
FIG. 4 illustrates a cross-sectional view of the faucet in the first embodiment of the present disclosure.

The faucet housing 1 comprises a body 11 and a faucet outlet 12, which are integrally connected together. The body 11 is cylindrical, and the faucet outlet 12 is connected to an upper side of the body 11. A lower end of the body 11 is configured to be fixedly connected to a countertop of a wash basin. The lower end of the body 11 is fixedly connected to the countertop through a threaded pipe and a threaded seat, which will not be described below.

Figure 3:
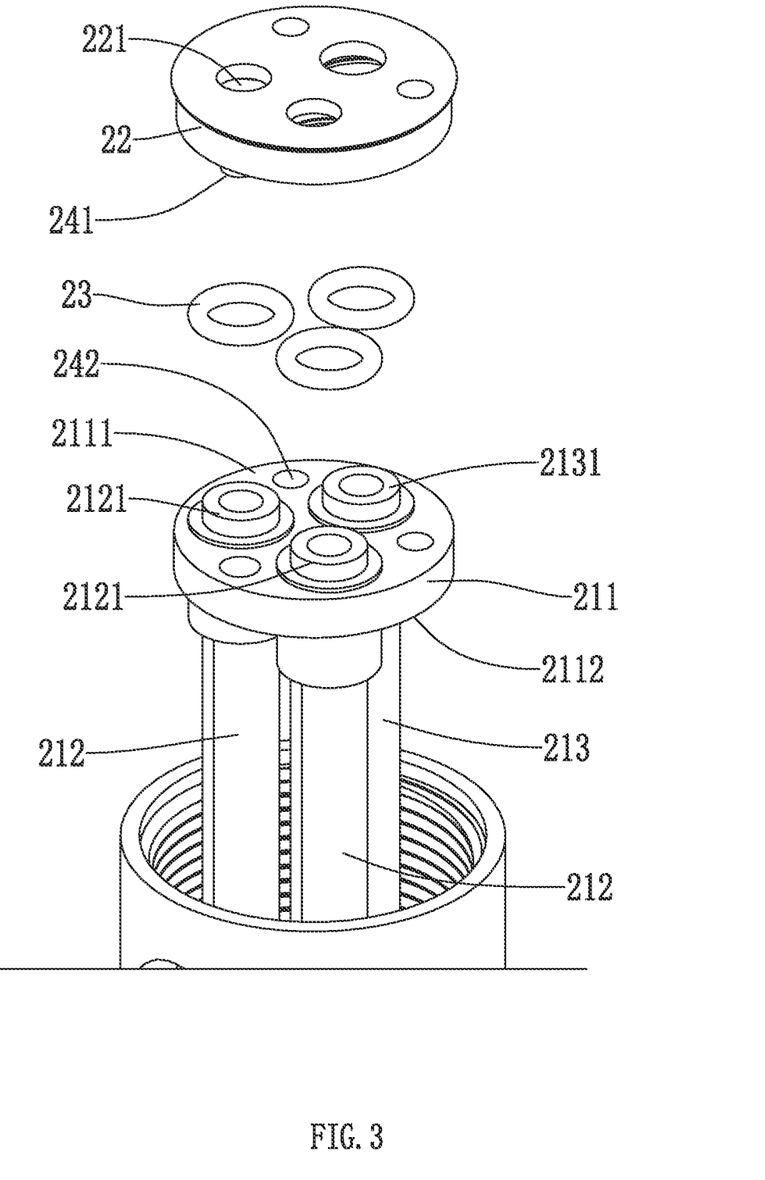
FIG. 3 illustrates a perspective view of a pipeline structure in the first embodiment of the present disclosure.

The pipeline structure comprises a pipeline assembly 21 and a valve seat 22. The pipeline assembly 21 comprises a connecting seat 211, at least one water inlet pipe 212, and at least one water outlet pipe 213. In this embodiment, the pipeline assembly 21 comprises two water inlet pipes 212 and a water outlet pipe 213. The two water inlet pipes 212 are respectively in communication with hot water and cold water. The connecting seat 211 is detachably connected to the valve seat 22. A first end of each of the two water inlet pipes 212 and a first end of the water outlet pipe 213 are integrally connected to the connecting seat 211. Each of the two water inlet pipes 212 comprises a first water inlet seat 2121 formed on the connecting seat 211. The water outlet pipe 213 comprises a second water outlet seat 2131 formed on the connecting seat 211. The first water inlet seat 2121 of each of the two water inlet pipes 212 and the second water outlet seat 2131 of the water outlet pipe 213 are respectively fluidly connected to the valve seat 22, and the valve 3 is configured to be connected to the valve seat 22. The two water inlet pipes 212, the water outlet pipe 213, and the connecting seat 211 are integrally connected together to be detachably connected to the valve seat 22 through the connecting seat 211, so that the two water inlet pipes 212 and the water outlet pipe 213 do not need to be respectively connected to the valve seat 22, which is easy to assemble and has a low cost. Further, the detachable connection between the valve seat 22 and the connecting seat 211 can be matched with different valve seats and is suitable for the installation of different valves.

In this embodiment, the connecting seat 211 comprises a first end surface 2111 and a second end surface 2112. The connecting seat 211 is in a shape of a disc. In some other embodiments, the connecting seat 211 can also be in a shape of a plate of different shapes, as long as the connecting seat 211 comprises the first end surface 2111 and the second end surface 2112. The valve seat 22 is detachably connected to the first end surface 2111. The first water inlet seat 2121 of each of the two water inlet pipes 212 and the second water outlet seat 2131 of the water outlet pipe 213 are respectively formed on the first end surface 2111. The first end of each of the two water inlet pipes 212 and the first end of the water outlet pipe 213 are integrally connected to the second end surface 2112 of the connecting seat 211. In this structure, a radial size of the pipeline structure is small and can be adapted to the body 11 of the faucet housing 1 with a small size.

The first water inlet seat 2121 of each of the two water inlet pipes 212 and the second water outlet seat 2131 of the water outlet pipe 213 respectively protrude from the first end surface 2111. The valve seat 22 comprises a plurality of connection ports 221. The connection ports 221 are respectively matched with and connected to the first water inlet seat 2121 of each of the two water inlet pipes 212 and the second water outlet seat 2131 of the water outlet pipe 213. The connection ports 221 are respectively connected to the first water inlet seat 2121 of each of the two water inlet pipes 212 and the second water outlet seat 2131 of the water outlet pipe 213 in an inserted manner, which can play a role of providing partial positioning connection between the valve seat and the connecting seat. During an installation process, when the valve seat 22 does not completely fit the first end surface 2111 of the connecting seat 211, the valve seat 22 and the first end surface 2111 will be separated by a certain distance. This situation can be quickly discovered during the installation process, which facilitates correction.

In this embodiment, each of the first water inlet seat 2121 of each of the two water inlet pipes 212 and the second water outlet seat 2131 of the water outlet pipe 213 are hermetically connected to a corresponding one of the plurality of connection ports 221 through a sealing ring 23. The sealing ring 23 is sleeved outside the first water inlet seat 2121 of each of the two water inlet pipes 212 or the second water outlet seat 2131 of the water outlet pipe 213. The sealing ring 23 enables the two water inlet pipes 212, the water outlet pipe 213, and the valve seat 22 to define a radial sealing connection and, compared with an axial sealing connection in the prior art, the sealing effect is better.

In this embodiment, a positioning connection structure is disposed between the first end surface 2111 and the valve seat 22. The positioning connection structure comprises a plurality of positioning posts 241 and a plurality of positioning holes 242. The connecting seat 211 comprises the plurality of positioning holes 242. The valve seat 22 comprises the plurality of positioning posts 241. The plurality of positioning posts 241 are inserted into the plurality of positioning holes 242 to achieve a positioning connection between the two.

In this embodiment, the pipeline structure comprises a plurality of the valve seats 22 of different sizes. The plurality of the valve seats 22 of different sizes are replaceably connected to the connecting seat 211. The plurality of the valve seats 22 of different sizes can be adapted to a plurality of the valves 3 of different sizes and have strong applicability.

In this embodiment, the pipeline assembly 21 is made of plastic, rubber, or elastomeric polymer. For example, the connecting seat 211 can be made of PE-RT (Polyethylene of raised temperature resistance) and glass fiber, and the water inlet pipe 212 and the water outlet pipe 213 are made of PE-RT, which is a copolymer of medium density polyethylene and octene. The second end surface 2112 of the connecting seat 211 comprises one or more notches, and the two water inlet pipes 212 or the water outlet pipe 213 are correspondingly inserted into the one or more notches. The first end of each of the two water inlet pipes 212 or the first end of the water outlet pipe 213 are partially melted and connected to the one or more notches of the connecting seat 211, and one or more notches are correspondingly connected to one or more circular protrusions on the first end surface 2111, so that the one or more circular protrusions on the first end surface 2111 form the first water inlet seat 2121 of each of the two water inlet pipes 212 and the second water outlet seat 2131 of the water outlet pipe 213, which protrude from the first end surface 2111. The valve seat 22 is made of PA (Polyamide).

Figure 5:
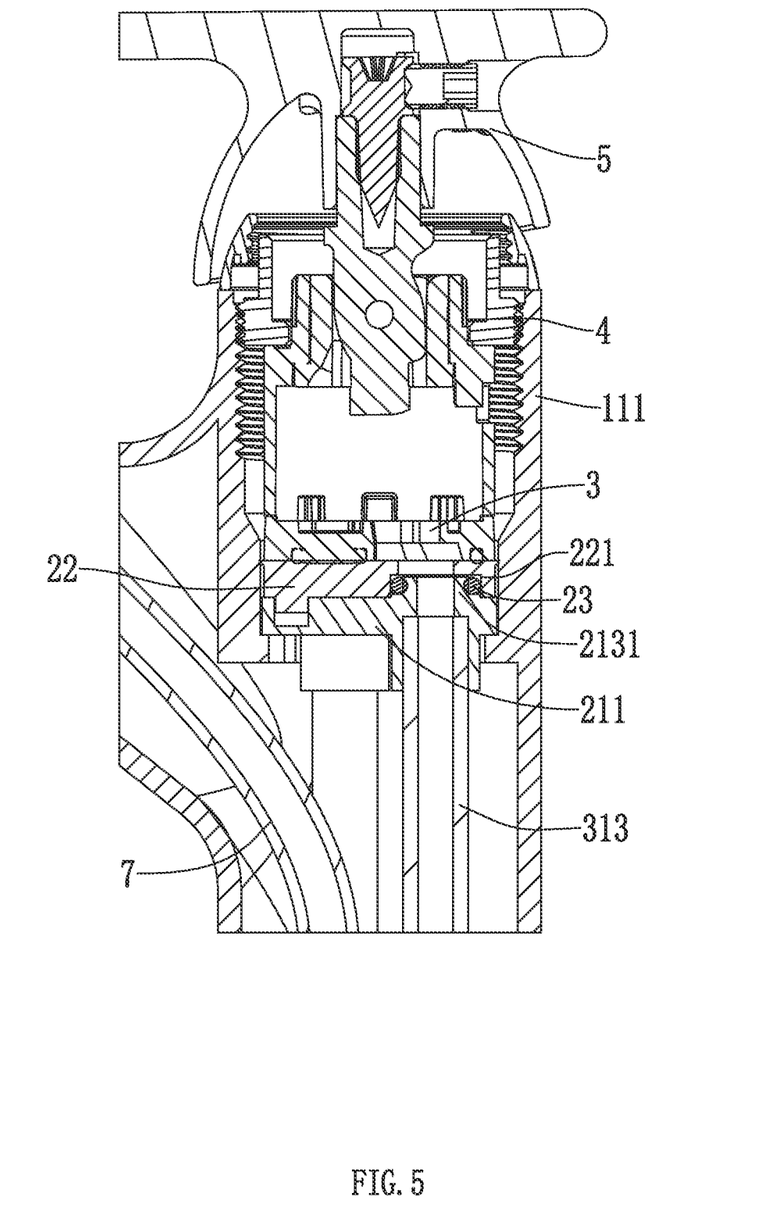
FIG. 5 illustrates a partial enlarged view of FIG. 4.

An upper end of the body 11 comprises an installation chamber 111. The connecting seat 211 is disposed in the installation chamber 111. The two water inlet pipes 212 and the water outlet pipe 213 are at least partially disposed in the body 11. A second end of each of the two water inlet pipes 212 and a second end of the water outlet pipe 213 are located outside the lower end of the body 11. The faucet comprises a connecting joint 6 and a water outlet connecting pipe 7. The connecting joint 6 is detachably connected to the end of the water outlet pipe 213 and the water outlet connecting pipe 7. The water outlet connecting pipe 7 at least extends through the body 11 and faucet outlet 12 to be connected to a distal end of faucet outlet 12. A connecting junction between the faucet outlet 12 and the body 11 comprises a passage opening 13 through which the water outlet connecting pipe 7 passes. The connecting seat 211 is disposed at a bottom of the installation chamber 111. The bottom of the installation chamber 111 comprises an installation opening 112 through which the two water inlet pipes 212 and the water outlet pipe 213 pass. The connecting seat 211, the valve seat 22, and the valve 3 are disposed in the installation chamber 111 from bottom to top, and the pressing lid 4 is tightly connected to the installation chamber 111 to fixedly press the valve 3. The handle assembly 5 is connected to a valve shaft of the valve 3, and the valve 3 can be controlled by turning the handle assembly 5.

Figure 6:
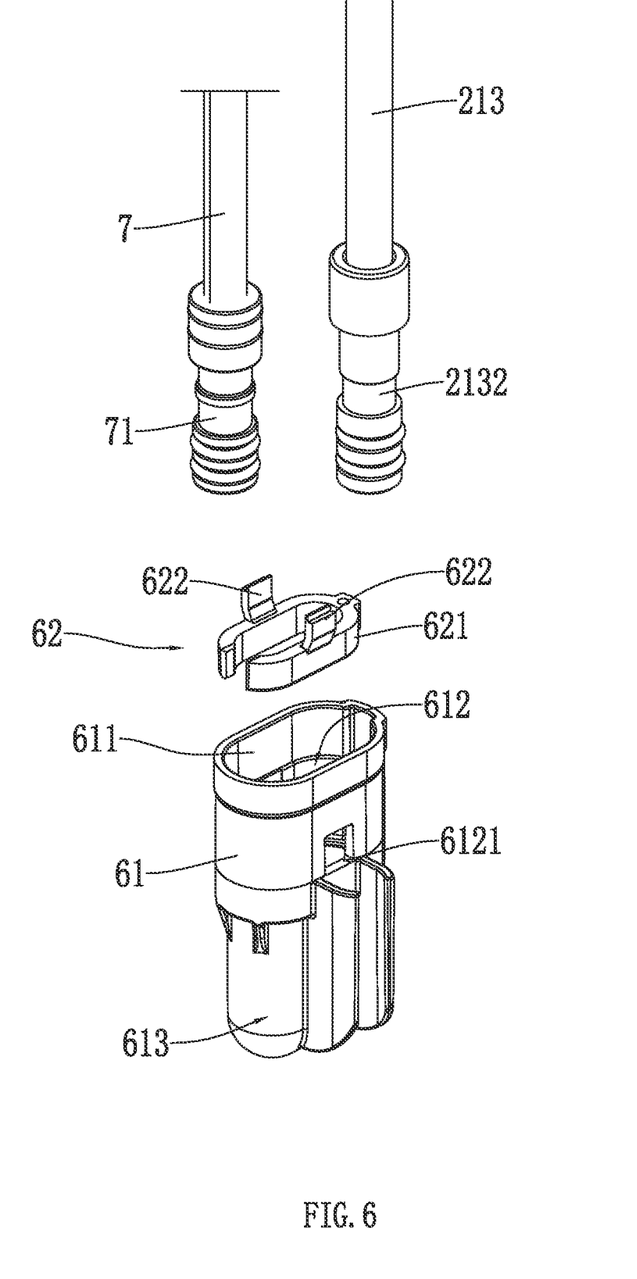
FIG. 6 illustrates a perspective exploded view of a connecting joint, a water outlet pipe, and a water outlet connecting pipe in the first embodiment of the present disclosure.
Figure 7:
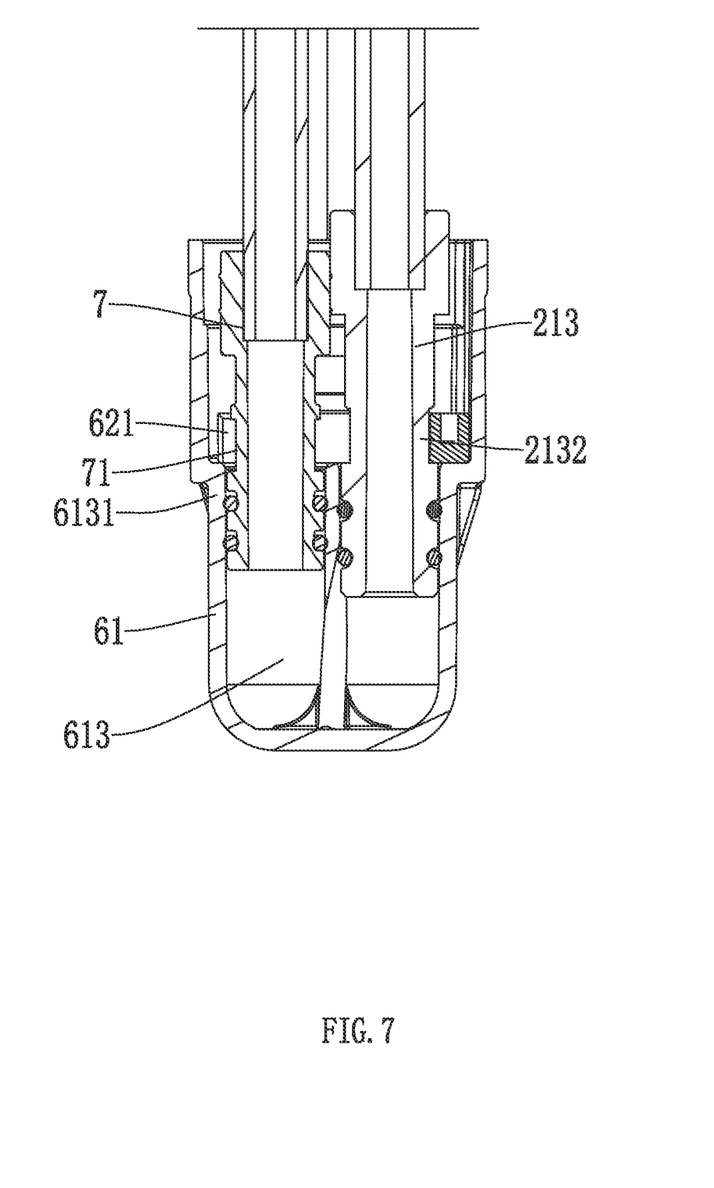
FIG. 7 illustrates a cross-sectional view of the connecting joint, the water outlet pipe, and the water outlet connecting pipe in the first embodiment of the present disclosure.

The connecting joint 6 comprises a connecting body 61 and a connecting buckle 62. The connecting body 61 comprises a connection opening 611. An upper part of the connection opening 611 forms a connection space 612. A lower part of the connection opening 611 forms an internal flow channel 613. Two inlets 6131 of the internal flow channel 613 are respectively connected to the connection space 612, and a buckle hole 6121 is formed in a wall of the connection space 612. The second end of the water outlet pipe 213 comprises a first annular groove 2132, and a first end of the water outlet connecting pipe 7 comprises a second annular groove 71. The connecting buckle 62 comprises a buckle ring 621 and an elastic buckle block 622 formed on the buckle ring 621. The buckle ring 621 is sleeved on and surrounds the first annular groove 2132 of the water outlet pipe 213 and the second annular groove 71 of the water outlet connecting pipe 7. The buckle ring 621, the second end of the water outlet pipe 213, and the first end of the water outlet connecting pipe 7 form a connection head, and the connection head is configured to be mounted from the connection opening 611 so that the elastic buckle block 622 is correspondingly connected to the buckle hole 6121 and the second end of the water outlet pipe 213 and the first end of the water outlet connecting pipe 7 are respectively connected to the two inlets 6131 of the internal flow channel 613. In this embodiment, the buckle hole 6121 penetrates through the wall of the connection space 612, and the elastic buckle block 622 is exposed outside the connecting body 61. When the connection head needs to be disassembled, a user only need to press the elastic buckle block 622 to disengage the elastic buckle block 622 from the buckle hole 6121. During an installation process, when the elastic buckle block 622 is installed in the connection opening 611, the elastic buckle block 622 is squeezed by the connection space 612, and bends and deforms inward until the elastic buckle block 622 corresponds to buckle hole 6121 to finish installation.

During the installation process, the second end of each of the two water inlet pipes 212 and the second end of the water outlet pipe 213 of the pipeline structure passes through the installation opening 112. After the second end of each of the two water inlet pipes 212 and the second end of the water outlet pipe 213 passes through the installation opening 112, the second end of each of the two water inlet pipes 212 and the second end of the water outlet pipe 213 passes out of the lower end of the body 11. The connecting seat 211 correspondingly abuts the bottom of the installation chamber 111. Then, the valve seat 22 is placed above the connecting seat 211 to be aligned with the positioning connection structure, and the one or more circular protrusions are inserted into the plurality of connection ports 221. The valve 3 is placed in the installation chamber 111 so that the valve 3 is in fluid communication with the valve seat 22. The pressing lid 4 is installed. The pressing lid 4 is threadedly connected to the installation chamber 111 to press the valve 3 to achieve a tight connection. The handle assembly 5 is then installed. Then, the first end of the water outlet connecting pipe 7 and the second end of the water outlet pipe 213 are connected together through the connecting joint 6. A second end of water outlet connecting pipe 7 enters the body 11 from the lower end of the body 11 to pass through the passage opening 13 so that the second end of the water outlet connecting pipe 7 is finally connected to the distal end the faucet outlet 12, and the distal end of the faucet outlet 12 is disposed with an aerator. Finally, the faucet is connected to the countertop, and the second ends of the two water inlet pipes 212 are respectively connected to a hot water source and a cold water source.

Figure 8:
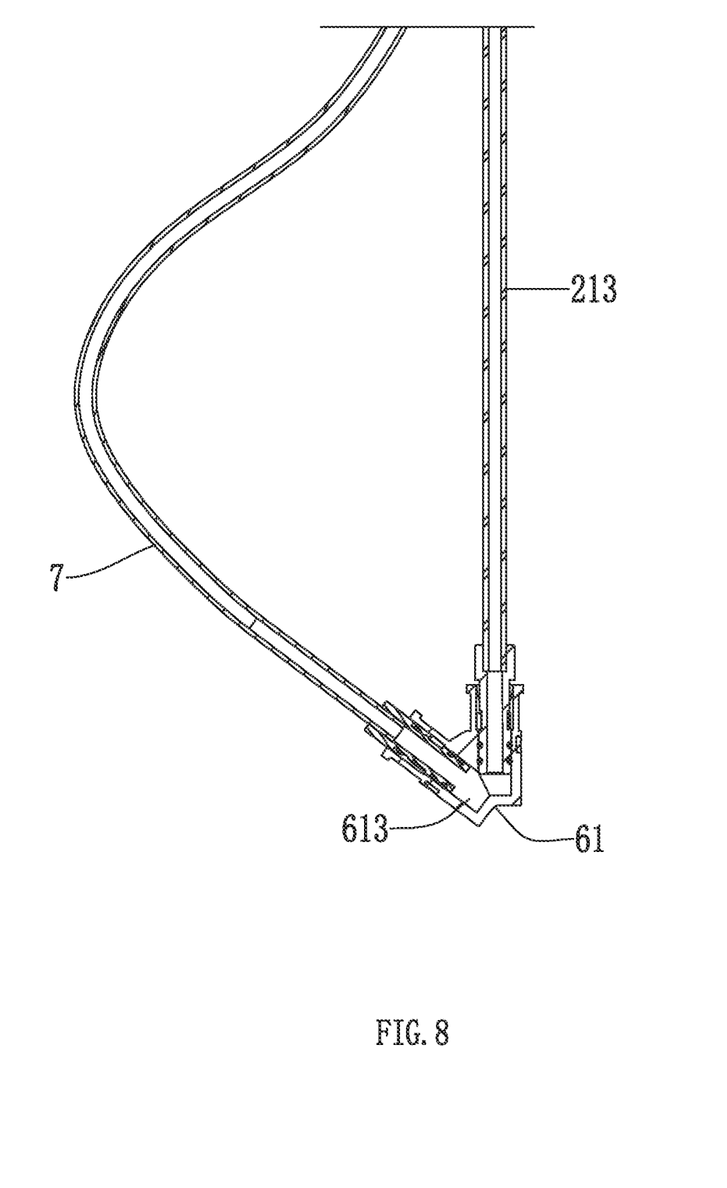
FIG. 8 illustrates a cross-sectional view of a connecting joint, a water outlet pipe, and a water outlet connecting pipe in a second embodiment of the present disclosure.
Figure 9:
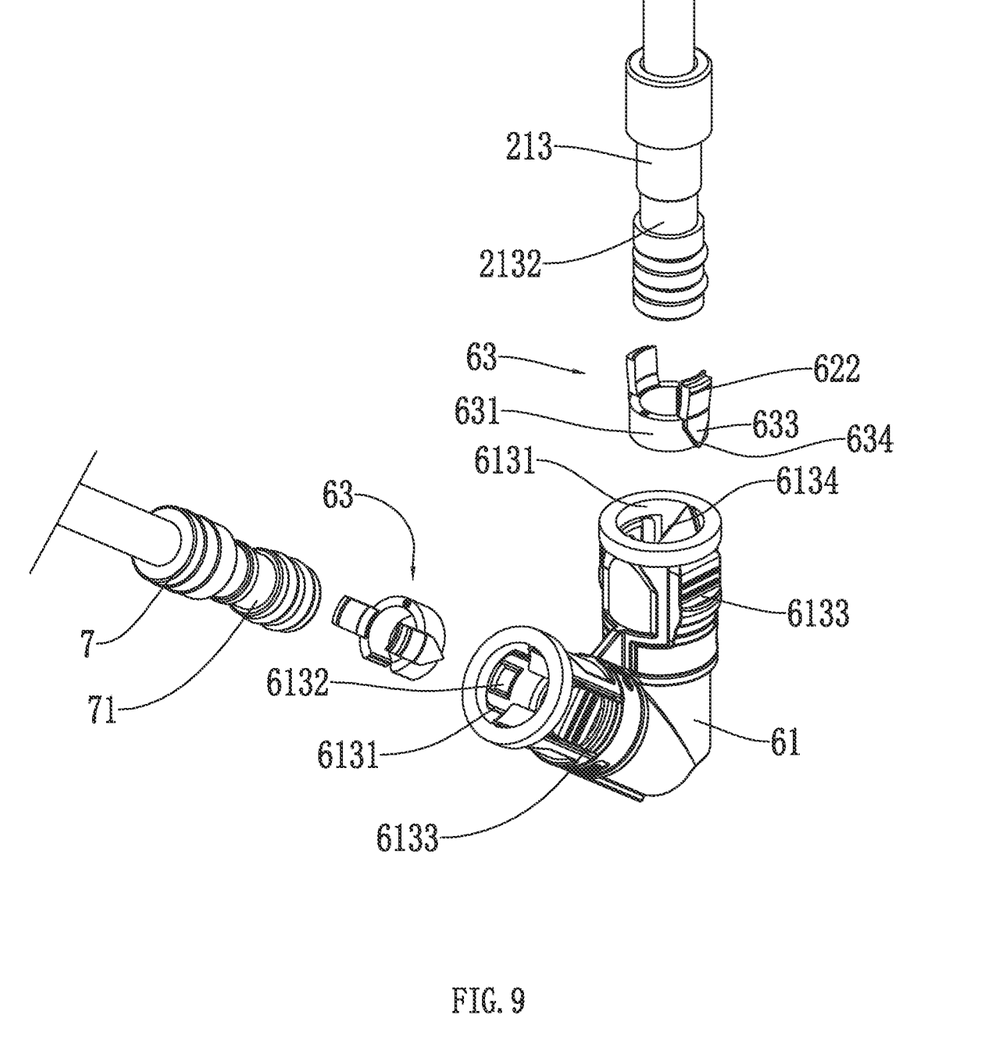
FIG. 9 illustrates a perspective exploded view of the connecting joint, the water outlet pipe, and the water outlet connecting pipe in the second embodiment of the present disclosure.

Referring to FIGS. 8-9, a second embodiment of the present disclosure is provided. In this embodiment, the connecting joint 6 comprises a connecting body 61 and two elastic buckles 63. The connecting body 61 comprises an internal flow channel 613, and two inlets 6131 of the internal flow channel 613 respectively face different directions. A hole 6132 is formed on an inside of each of the two inlets 6131, and an operation button 6133 corresponding to the hole 6132 is disposed on an outside of each of the two inlets 6131. The second end of the water outlet pipe 213 forms a first annular groove 2132, and the first end of the water outlet connecting pipe 7 forms a second annular groove 71. Each of the two elastic buckles 63 comprises a buckle ring portion 631 and an elastic buckle block 622 formed on the buckle ring portion 631. The buckle ring portion 631 is rotatably sleeved on the first annular groove 2132 or the second annular groove 71. An inner wall of the inlet 6131 comprises a guiding groove 6134. A circumferential width of the guiding groove 6134 gradually increases in a direction toward an entrance of a corresponding one of the two inlets 6131. Each of the two elastic buckles 63 comprises a guiding block 633 configured to extend into the guiding groove 6134. The guiding block 633 is configured to be guided and slide in the guiding groove 6134 to deflect a corresponding one of the two elastic buckles 63 to rotate until the corresponding one of the two elastic buckle blocks 622 corresponds to the hole 6132. The operation button 6133 can be pressed to correspond to the corresponding one of the two elastic buckle blocks 622 so that the corresponding one of the two elastic buckle blocks 622 can release a connection with the hole 6132.

In this embodiment, the guiding block 633 comprises two guiding inclined surfaces 634, axial front ends of the two guiding inclined surfaces 634 intersect, and a distance between axial rear ends of the two guiding inclined surfaces 634 gradually increases. The guiding block 633 is formed on an axial front end of each of the two elastic buckle blocks 622, and an axial rear end of each of the two elastic buckle blocks 622 can be snap-connected with the hole 6132.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A pipeline structure of a faucet, comprising:
   a pipeline assembly, and
   a valve seat, wherein:
   the pipeline assembly comprises a connecting seat, at least one water inlet pipe, and at least one water outlet pipe,
   an end surface of the connecting seat is detachably connected to the valve seat,
   the at least one water inlet pipe and the at least one water outlet pipe are integrally connected to the connecting seat,
   the at least one water inlet pipe comprises a first water inlet seat protruding from the end surface of the connecting seat,
   the at least one water outlet pipe comprises a first water outlet seat protruding from the end surface of the connecting seat,
   the first water inlet seat of the at least one water inlet pipe and the first water outlet seat of the at least one water outlet pipe are respectively fluidly connected to the valve seat,
   a valve is configured to be connected to the valve seat,
   the valve seat comprises a plurality of connection ports, and
   the plurality of connection ports are respectively in fluid communication with the first water inlet seat of the at least one water inlet pipe and the first water outlet seat of the at least one water outlet pipe.

2. The pipeline structure of the faucet according to claim 1, wherein:
   each of the first water inlet seat of the at least one water inlet pipe and the first water outlet seat of the at least one water outlet pipe is hermetically connected to a corresponding one of the plurality of connection ports through a sealing ring.

3. The pipeline structure of the faucet according to claim 1, wherein:
   a positioning connection structure is disposed between the end surface and the valve seat.

4. The pipeline structure of the faucet according to claim 3, wherein:
   the pipeline structure adapts to a plurality of the valve seats of different sizes, and
   the plurality of the valve seats of different sizes are replaceably connected to the connecting seat.

5. The pipeline structure of the faucet according to claim 1, wherein:
   the pipeline structure adapts to a plurality of the valve seats of different sizes, and
   the plurality of the valve seats of different sizes are replaceably connected to the connecting seat.

6. The pipeline structure of the faucet according to claim 1, wherein:
   the pipeline assembly is made of plastic, rubber, or elastomeric polymer.

7. The pipeline structure of the faucet according to claim 1, wherein:
   the plurality of connection ports are respectively in fluid communication with the first water inlet seat of the at least one water inlet pipe and the first water outlet seat of the at least one water outlet pipe in an inserted manner.

8. A faucet, comprising:
   a pipeline structure of the faucet, wherein:
   the pipeline structure of the faucet comprises a pipeline assembly and a valve seat,
   the pipeline assembly comprises a connecting seat, at least one water inlet pipe, and at least one water outlet pipe,
   an end surface of the connecting seat is detachably connected to the valve seat,
   the at least one water inlet pipe and the at least one water outlet pipe are integrally connected to the connecting seat,
   the at least one water inlet pipe comprises a first water inlet seat formed on the end surface of the connecting seat,
   the at least one water outlet pipe comprises a first water outlet seat formed on the end surface of the connecting seat, the first water inlet seat of the at least one water inlet pipe and the first water outlet seat of the at least one water outlet pipe are respectively fluidly connected to the valve seat, a valve is configured to be connected to the valve seat, the faucet comprises a faucet housing, a connecting joint, a water outlet connecting pipe, the faucet housing comprises a body and a faucet outlet which are integrally connected together, the faucet outlet is connected to an upper side of the body, an upper end of the body comprises an installation chamber, the connecting seat is disposed in the installation chamber, the at least one water inlet pipe and the at least one water outlet pipe are at least partially disposed in the body, a second end of the at least one water inlet pipe and a second end of the at least one water outlet pipe are located outside a lower end of the body, the connecting joint is detachably connected to the second end of the at least one water outlet pipe and the water outlet connecting pipe, the water outlet connecting pipe at least extends through the body and the faucet outlet to be connected to a distal end of the faucet outlet, the connecting joint comprises a connecting body and a connecting buckle, the connecting body comprises a connection opening, an upper part of the connection opening forms a connection space, a lower part of the connection opening forms an internal flow channel, two inlets of the internal flow channel are respectively connected to the connection space, a buckle hole is formed in a wall of the connection space, the second end of the at least one water outlet pipe comprises a first annular groove, a first end of the water outlet connecting pipe comprises a second annular groove, the connecting buckle comprises a buckle ring and an elastic buckle block formed on the buckle ring, the buckle ring is configured to be sleeved on and surrounds the first annular groove of the at least one water outlet pipe and the second annular groove of the water outlet connecting pipe, the buckle ring, the second end of the at least one water outlet pipe, and the first end of the water outlet connecting pipe are configured to form a connection head, and the connection head is configured to be mounted from the connection opening so that the elastic buckle block is correspondingly connected to the buckle hole and the second end of the at least one water outlet pipe and the first end of the water outlet connecting pipe are respectively connected to the two inlets of the internal flow channel.

9. The faucet according to claim 8, wherein:
a connecting conjunction between the faucet outlet and the body comprises a passage opening through which the water outlet connecting pipe passes.

10. The faucet according to claim 8, wherein:
the connecting seat is disposed at a bottom of the installation chamber, and the bottom of the installation chamber comprises an installation opening through which the at least one water inlet pipe and the at least one water outlet pipe passes.

11. The faucet according to claim 8, wherein:
the faucet comprises the valve and a pressing lid,
the connecting seat, the valve seat, and the valve are disposed in the installation chamber from bottom to top, and
the pressing lid is connected to the installation chamber to fixedly press the valve.

12. A faucet, comprising:
a pipeline structure of the faucet, wherein:
the pipeline structure of the faucet comprises a pipeline assembly and a valve seat,
the pipeline assembly comprises a connecting seat, at least one water inlet pipe, and at least one water outlet pipe,
an end surface of the connecting seat is detachably connected to the valve seat,
the at least one water inlet pipe and the at least one water outlet pipe are integrally connected to the connecting seat,
the at least one water inlet pipe comprises a first water inlet seat formed on the end surface of the connecting seat,
the at least one water outlet pipe comprises a first water outlet seat formed on the end surface of the connecting seat,
the first water inlet seat of the at least one water inlet pipe and the first water outlet seat of the at least one water outlet pipe are respectively fluidly connected to the valve seat,
a valve is configured to be connected to the valve seat,
the faucet comprises a faucet housing, a connecting joint, a water outlet connecting pipe,
the faucet housing comprises a body and a faucet outlet which are integrally connected together,
the faucet outlet is connected to an upper side of the body,
an upper end of the body comprises an installation chamber,
the connecting seat is disposed in the installation chamber,
the at least one water inlet pipe and the at least one water outlet pipe are at least partially disposed in the body,
a second end of the at least one water inlet pipe and a second end of the at least one water outlet pipe are located outside a lower end of the body,
the connecting joint is detachably connected to the second end of the at least one water outlet pipe and the water outlet connecting pipe,
the water outlet connecting pipe at least extends through the body and the faucet outlet to be connected to a distal end of the faucet outlet,
the connecting joint comprises a connecting body and two elastic buckles,
the connecting body comprises an internal flow channel,
two inlets of the internal flow channel respectively face different directions,
a hole is formed on an inside of each of the two inlets,
an operation button corresponding to the hole is disposed on an outside of each of the two inlets,
the second end of the at least one water outlet pipe forms a first annular groove, a first end of the water outlet connecting pipe forms a second annular groove, each of the two elastic buckles comprises a buckle ring portion and an elastic buckle block formed on the buckle ring portion, the buckle ring portion is rotatably sleeved on the first annular groove or the second annular groove, an inner wall of each of the two inlets comprises a guiding groove, a circumferential width of the guiding groove gradually increases in a direction toward an entrance of a corresponding one of the two inlets, each of the two elastic buckles comprises a guiding block configured to extend into the guiding groove, the guiding block is configured to be guided and slide in the guiding groove to deflect a corresponding one of the two elastic buckles to rotate until a corresponding one of the two elastic buckle blocks corresponds to the hole, and the operation button is configured to be pressed to correspond to the corresponding one of the two elastic buckle blocks so that the corresponding one of the two elastic buckle blocks is configured to release a connection with the hole.

13. The faucet according to claim 12, wherein:

the guiding block comprises two guiding inclined surfaces, axial front ends of the two guiding inclined surfaces intersect, a distance between axial rear ends of the two guiding inclined surfaces gradually increases, the guiding block is formed on an axial front end of each of the two elastic buckle blocks, and an axial rear end of each of the two elastic buckle blocks is configured to be snap-connected with the hole.

\* \* \* \* \*